Sept. 19, 1944.   S. E. WILLETT ET AL   2,358,753
VACUUM OPERATED SERVO-MOTOR
Filed May 18, 1942   4 Sheets-Sheet 3

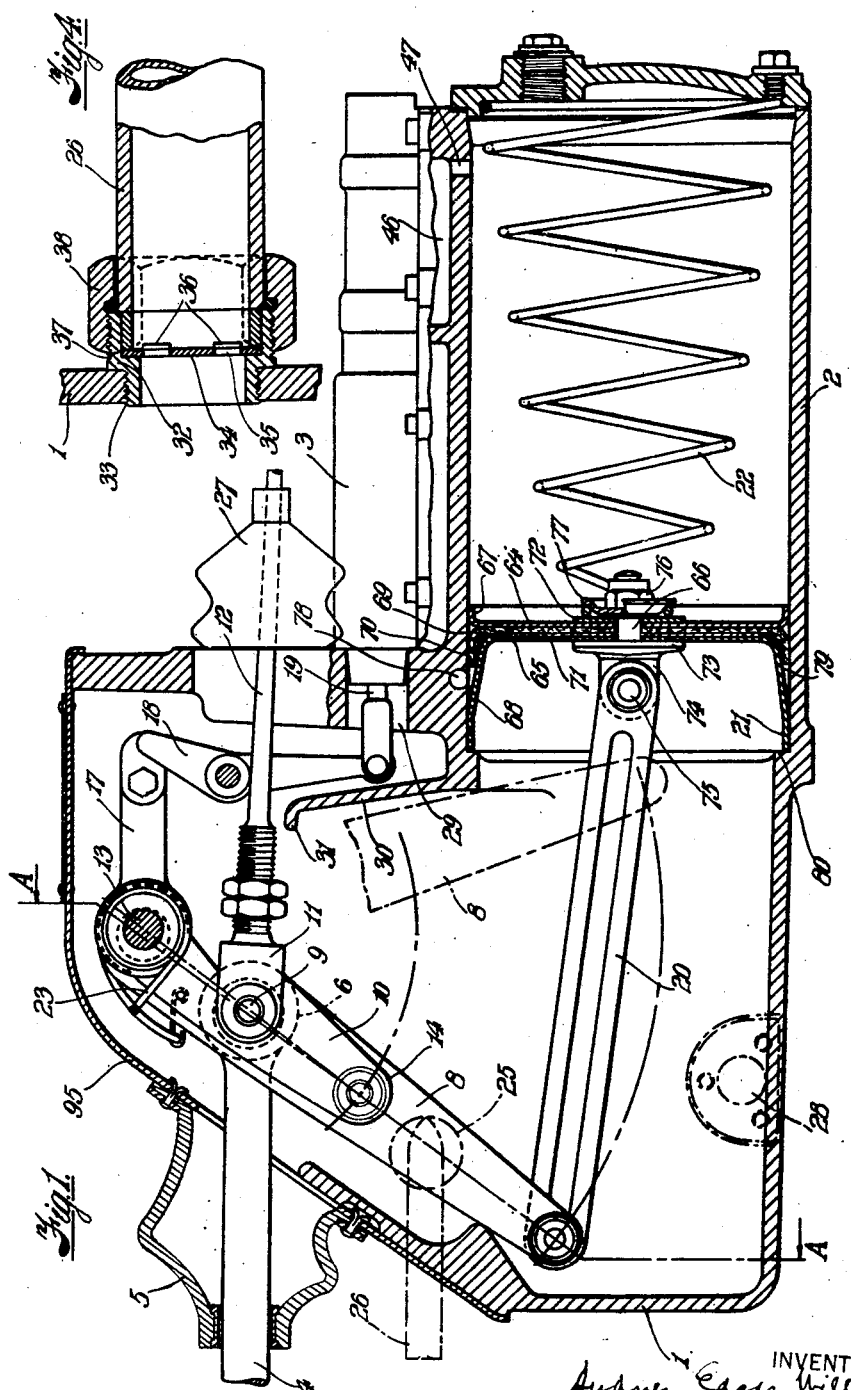

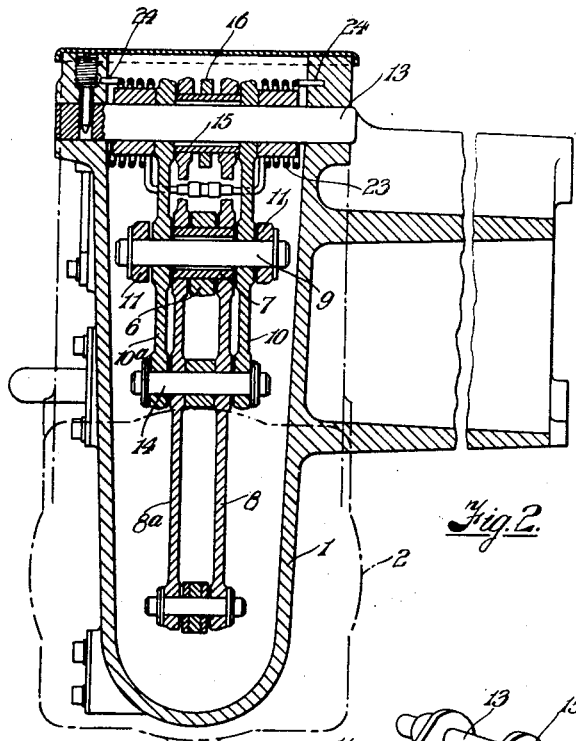
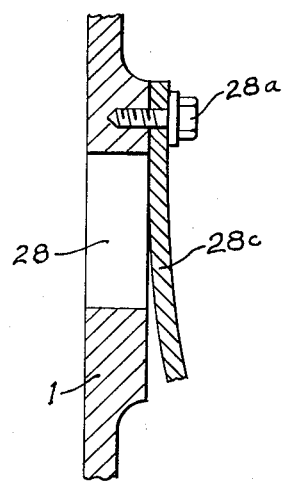
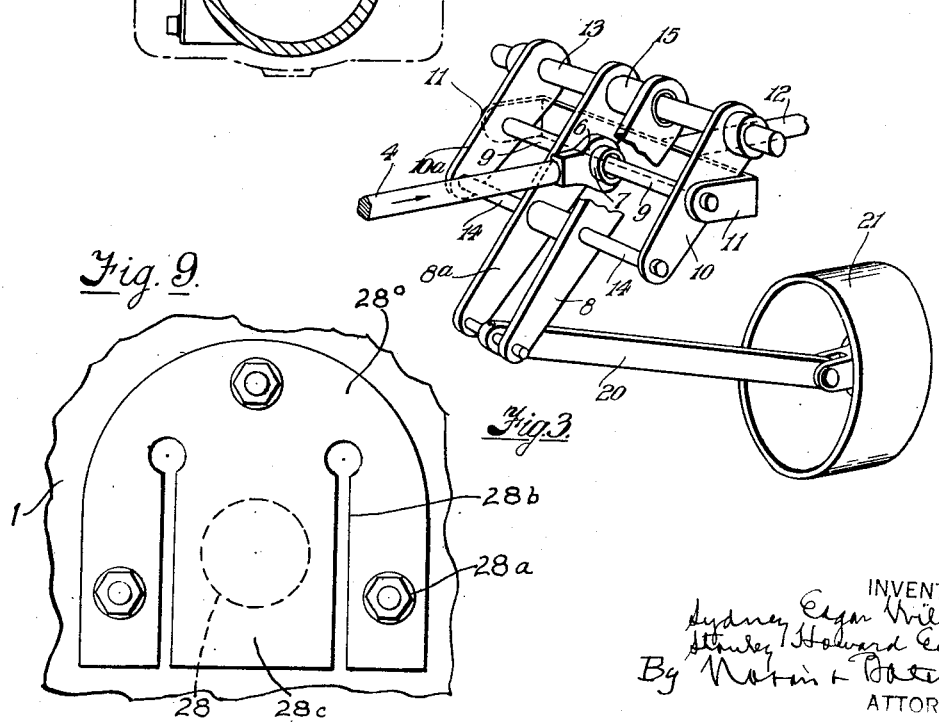

INVENTORS
Sydney Edgar Willett
Stanley Howard Eage
By Norris L. Bateman
ATTORNEYS Patented Sept. 19, 1944

2,358,753

UNITED STATES PATENT OFFICE 2,358,753

VACUUM OPERATED SERVOMOTOR

Sydney Edgar Willett and Stanley Howard Edge, Lincoln, England, assignors to Clayton Dewandre Company Limited, Lincoln, England Application May 18, 1942, Serial No. 443,526
In Great Britain May 30, 1941

17 Claims. (Cl. 121—41)

This invention relates to vacuum or pressure operated servo brake devices and to the kind wherein the movements imparted to a hand lever or pedal are transmitted through reaction mechanism having connections to a control valve and a servo cylinder whereby the movement of a piston in the cylinder is utilised to augment the effort transmitted to an output shaft or rod which is connected directly to the brake applying means.

Vacuum operated servo devices for application to automobile road vehicles are commonly constructed as units, the casing of each unit embodying a vacuum cylinder, a valve (hereinafter referred to as the distributor valve) controlling the admission of air or vacuum to the cylinder and an arrangement of levers for transmitting manual effort to the valve and for enabling the movement of a piston in the cylinder to react upon the transmitting means. As vehicles fitted with these units, especially vehicles used in warfare, frequently have to traverse country which may be sandy or waterlogged it is essential, in order to ensure efficient operation of the servo unit, that its component parts shall be adequately protected against the ingress of sand, mud and water whilst permitting entry of a sufficient amount of air when required to release the vacuum in the operating cylinder.

The object of the present invention is to provide improvements in such brake operating units, such improvements being designed more particularly for application to heavy transport vehicles or armoured vehicles to enable the braking effort applied to be directly transmitted to the operating components, to protect the operative parts of the unit against the ingress of sand, mud and water whilst permitting entry of a sufficient amount of air for operative purposes and also to improve the construction and arrangement of component valves and pistons to facilitate assembly and ensure efficiency in operation.

According to the invention a monobloc servo brake unit of the kind above described is provided wherein a pedal operated rod and a brake actuating rod are both connected to a common element mounted in a reaction lever forming part of the transmission mechanism and arranged so that a direct central pull or push movement is transmitted from the pedal rod to the brake rod to apply the brakes when the servo cylinder is inoperative.

According to the preferred form of the invention the cylinder, distributor valve housing and transmission mechanism casing of the improved servo brake device are all constructed as a unit wherein the air inlet is to the said casing in which the air is caused to take a tortuous path and to pass over a baffle or baffles for the purpose of removing its dust content before it enters a passage or conduit leading to the distributor valve.

The invention also includes improved distributor valve arrangements and piston constructions all designed particularly for application to the said servo brake unit for the purpose of rendering the same compact, light, dust free and positively lubricated.

Reference will now be made to the accompanying drawings which illustrate a construction according to the invention and in which:

Fig. 1 is a sectional elevation of a complete monobloc servo brake operating unit.

Fig. 2 is a cross-sectional elevation taken on the line A—A of Fig. 1.

Figure 5:
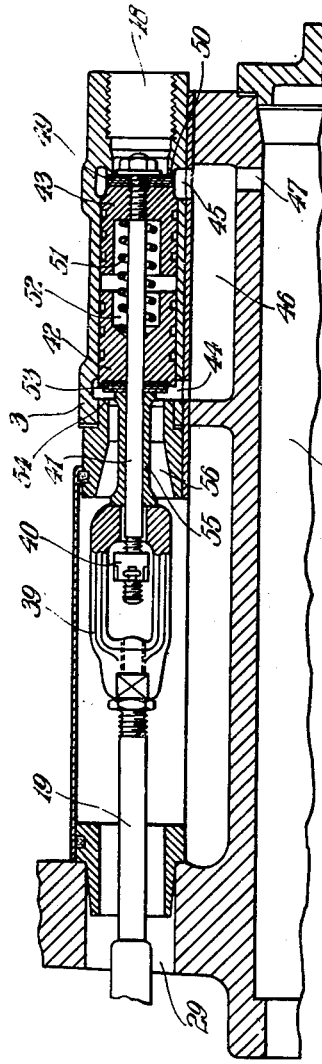
Figure 6:
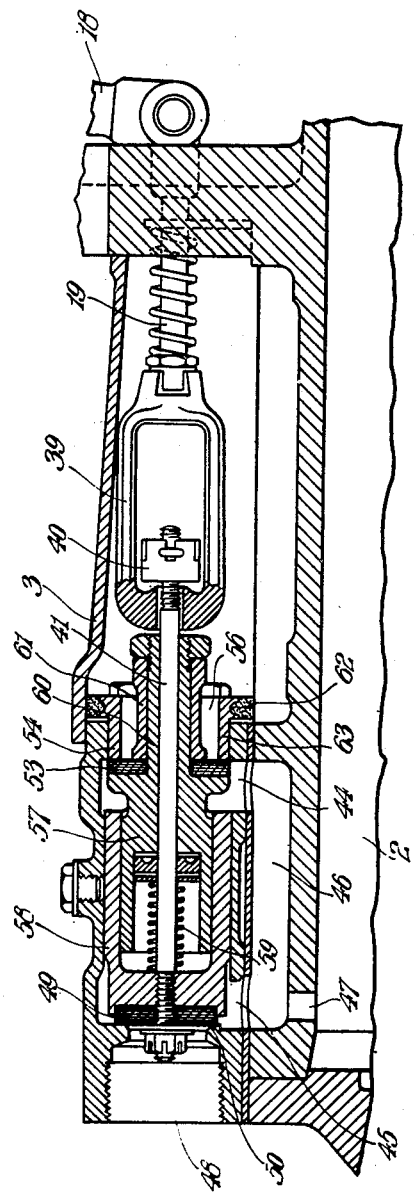
Figure 7:
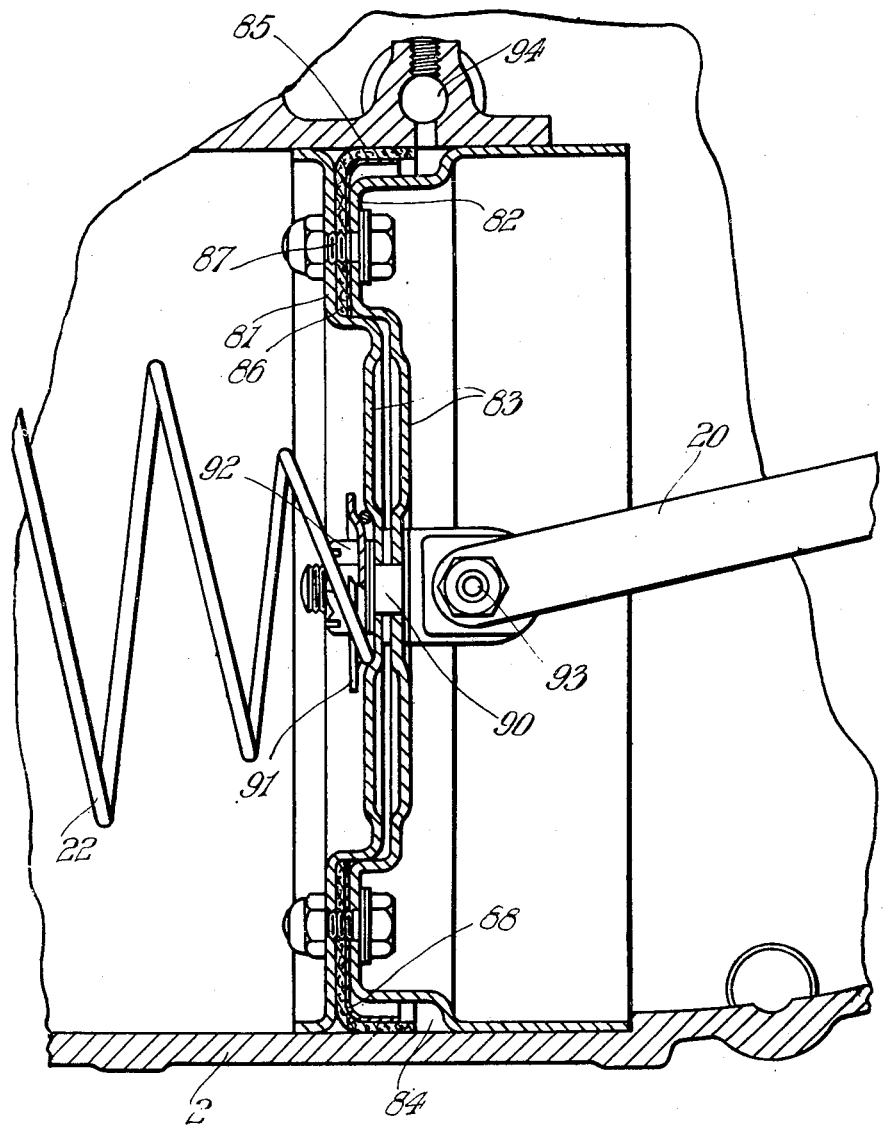

Fig. 3 is a diagrammatic perspective view of the transmission lever system shown in Figs. 1 and 2, Fig. 4 is a detail view of an air inlet to the casing, Fig. 5 is a sectional elevation of a valve construction applicable to the unit shown in Fig. 1, Fig. 6 is a sectional elevation of an alternative valve construction, Fig. 7 is a sectional elevation of an alternative piston construction for use in the servo cylinder, and Fig. 8 is a vertical section and Fig. 9 is an exterior elevation of the lower portion of the casing of the device, showing on an enlarged scale a valve for the relief of excess air pressure or oil.

In the construction illustrated and referring first to Fig. 1, the monobloc servo unit comprises a main casing 1 which is formed integral with a servo cylinder 2 and is attached to a valve housing 3.

The brake control is initiated by means of a pedal actuated rod 4 which passes through a flexible boot 5 into the casing 1. The function of the boot 5 is to prevent ingress of dust, mud or water as the rod 4 is reciprocated. The rod 4 terminates in an eye 6 surrounding a tubular bushing 7 carried by two arms 8 and 8a which together form the reaction lever of the mechanism. The bushing 7 surrounds, but is spaced from, a pin 9 whose outer portions pass through a pair of brake levers 10 and 10a, the outer ends of said pin 9 having affixed thereto the forked ends 11 of an output rod 12 which is connected to the brake applying mechanism. The brake levers 10 and 10a are movably mounted at their upper ends around a fixed pivot rod 13 whose ends are mounted in the side walls of the casing 1 as shown in Fig. 2. The brake levers 10 and 10a are pivotally connected to the arms 8 and 8a by means of a pin 14 and the upper ends of the arms 8 and 8a carry a bushing 15 which freely surrounds and is spaced from the pivot rod 13, the said bushing also carrying an eye 16 formed at one end of a bolt 17 connected to a pivoted lever 18 through which the rod 19 of a distributor valve housed in the casing 3 is operated. The arrangement above described will be more readily understood by reference to the perspective diagram, Fig. 3, wherein, for the sake of clearness, the various arms and levers are shown more widely spaced along the rod 13 than they are in actual practice.

The lower end of the reaction lever 8 is connected by an arm 20 to a piston 21 in servo cylinder 2 the said piston being adapted to make its operative stroke against the resistance of a spring 22. A spring 23 opposes movement of the reaction lever towards the position shown in broken lines in Fig. 1, and assists in restoring it to its inoperative position when pressure on the operating pedal is relaxed. The ends of spring 23 are enclosed in the wall of casing 1 at 24 (Fig. 2).

An air inlet to the casing 1 is shown at 25, Fig. 1 and may be simply a cowled inlet or may communicate by means of a conduit indicated by broken lines 26 with an inlet situated at a higher level than the uppermost part of the casing 1. The casing is otherwise sealed against entry of air as the output spindle 12 is also fitted with a flexible boot 27. The only other opening in the casing is at 28, this opening being normally closed by a valve capable of opening when the level of oil within the casing exceeds a predetermined amount. This valve consists of a flexible flap 28° fixed to the outer side of the casing by screws 28ª, the flap having two vertical slits 28ᵇ so that its central portion 28ᶜ is free at its lower portion and can swing open to uncover the opening 28 in the lower portion of the casing, as shown in detail in Figs. 8 and 9, and thereby permit escape of excess air pressure or oil. Thus, the casing is supplied with air only through the inlet 25 and when the distributor valve 3 is moved to a position in which the vacuum in cylinder 2 is relaxed, air for this purpose is supplied only from within the casing 1. The position of the air inlet 25 and the presence of the system of levers 8, 8a, 10 and 10a between this inlet and the inlet 29 to the distributor valve causes the air to take a tortuous path and in doing so to deposit its dust content, this operation being aided by the provision of a baffle 30 adjacent the inlet 29 over which baffle the air is compelled to pass to reach the inlet. By forming this baffle with an inclination as shown or by the addition of a lip 31, a surface is formed against which the air strikes and which causes deposit of dust by changing the direction of motion of the air. It will be understood that the nature and position of the air inlet 25 will prevent ingress of any relatively large particles of solid matter and that the arrangement above described for controlling the passage of air through the casing 1 will remove the fine particles of dust carried in suspense in the air which will deposit upon the oil in the base of the casing and eventually pass away as the excess oil escapes gradually through the outlet 28. In this manner the mechanism of the servo device is protected against the ingress of dust which would tend to choke the fine orifices of the distributor valve mechanism and in a short time render the device as a whole ineffective.

In order to prevent, as far as possible, dust laden air from entering the casing 1, the device shown in Fig. 4 may be employed. This device comprises a metal plug 32 externally screw threaded at 33 to enable it to be fixed in the opening 25 which is internally screw threaded for the purpose. Within the plug is disposed a baffling device in the form of a disc 34 formed with a number of radially or otherwise disposed slots 35 with the material partly punched out to form the slots bent to form louvres 36. The outer portion of the plug is screw threaded at 37 in order that a cowl may be mounted thereon or that a coupling member 38 may be attached for screwing to the plug the conduit 26 opening in an upper part of the vehicle as previously described. By employing the slotted and louvred disc 34 as described, the incoming air is compelled by the louvres to change its course and in doing so to deposit its dust content in the outer part of the plug. This arrangement is particularly suitable for vehicles which are intended for operation in dusty or sandy areas.

The arrangements already described for excluding dust from the casing 1 will exclude water also. Servo devices of this character must of necessity be arranged on the underframe of a vehicle, and if that vehicle is destined for use in rough country where streams have to be crossed, the conduit 26 is essential so that the actual air inlet is situated above the level of any water through which the vehicle must pass. Pressure of water upon the exterior of the casing 1 would tend to close the valve controlling the opening 28 (not shown) firmly onto its seat so that no water would enter the casing through the opening 28. This arrangement of an inlet control has been designed so as to vary as little as possible the usual manner of manufacture of servo brake operating units and also to avoid any substantial addition to the cost thereof.

The valve operating rod 19 is secured to a stirrup 39 (Fig. 5) which is adapted to engage a collar 40 at one end of a valve spindle 41 which carries valve members 42 and 43, the valve member 42 being loosely mounted on the spindle and the valve member 43 being fixed to the spindle. The two valve members are movable in the cylindrical housing 3 having ports 44 and 45 adapted to communicate with the servo cylinder 2 through space 46 and port 47 in the wall of said cylinder. The end of the valve housing 3 remote from the rod 19 is connected to a conduit 48 communicating with a source of vacuum and this end of the housing is normally closed by a valve disc 49 of yieldable material which is carried by the valve member 43 and seats on an annular seating 50 on which it is held by the action of a spring 51 disposed in an annular space 52 between the two valve members 42 and 43. The valve member 42 also carries a valve disc 53 of yieldable material which is adapted to seat on an annular seating 54 but is normally held off its seating by means of a sleeve 55 slidable on the spindle 41 one end of which sleeve abuts against the inner end of the stirrup 39 so that under normal conditions air which enters the casing 3 through the annular passage 29 surrounding the rod 19 can pass through an annular passage 56 surrounding the sleeve 55 and pass through the port 44, space 46 and port 47 into the servo cylinder 2. When the rod 19 is moved towards the left (Fig. 5) by the pedal operated mechanism the pressure of the stirrup 39 on the sleeve 55 is relaxed so that the spring 51 can expand and push the valve member 53 on to its seating 54 and thereby shut off the air supply to the cylinder 2. This movement of the rod 19 also causes the stirrup 39 to exert a pull on the collar 40 to move the spindle 41 towards the left to pull the valve disc 49 off its seating and thereby open the cylinder 2 to vacuum through the port 45, space 46 and cylinder port 47. Immediately the pull on the rod 19 is relaxed the spring 51 restores the valve disc 49 on to its seating to shut off the cylinder from the vacuum and the sleeve 55 operates, as already described to open the air inlet port 44.

The construction illustrated in Fig. 6 is designed for use where greater compactness is required than in Fig. 5. Similar reference numerals are used to indicate parts similar to those shown in Fig. 5, but the two constructions differ essentially in that in Fig. 6 a valve member 57 is disposed slidably within a valve member 58 which carries the yieldable disc 49 adapted to engage the seating 50 to shut off the cylinder 2 from a vacuum conduit secured to the socket 48. The valve members are normally held apart on their seatings by a spring 59 and the valve member 58 is secured to the spindle 41 carrying the collar 40 with which the stirrup 39 is adapted to engage as in the previous construction.

The valve member 57 carries the yieldable valve disc 53 and has a cylindrical extension 60 over which a sleeve 61 is mounted, this sleeve being engaged by the end of the stirrup 39.

With the construction shown a pull exerted on the stirrup towards the right (Fig. 6) will move the vacuum valve disc 49 off its seating against the action of spring 59, whilst movement of the stirrup in the opposite direction will push the valve member 57 towards the left and lift the disc 53 off its seating thereby opening the interior of the cylinder 2 to atmosphere.

The valve housing 3 is sealed against entry of water by means of a packing of felt or other material 62 disposed in an annular groove surrounding a sleeve 63 fitted within the end of the housing which surrounds the sleeve 61, said sleeve 63 forming at its inner end the seating 54 for the valve disc 53.

In operation, the opening of valve 49 allows vacuum to be exerted through a port 45, a space 46 and port 47 in the wall of cylinder 2. When valve 49 is closed and valve 53 is moved off its seating, air entering through the annular passage 56 passes by way of port 44, space 46 and port 47 to the cylinder 2.

In both forms of valves described the flexible valve discs 49 and 53 are preferably formed of a synthetic rubber material such, for example, as that known as neoprene.

The brake operating mechanism above described is provided with a piston adapted to operate in the cylinder 2 and whose construction is such that it is lighter than hitherto, is better adapted to resist wear and can be more efficiently lubricated.

Referring first to the piston shown as part of Fig. 1, 64 and 65 indicate two steel pressings adapted to be connected at their centres by a bolt 66 to form the complete piston. The component 64 consists of a plain dished member having a flat inner face merged into the side wall by a rounded edge 67. The component 65 is of frusto-conical form with a cylindrical skirt 68 and also has a flat inner face.

Clamped between the flat inner faces of the piston components 64 and 65 is a washer 69 of flexible material whose peripheral portion 70 is forced into cup formation by insertion in the cylinder 2 with the wall of which the portion 70 is maintained in contact by an annular dished leaf spring 71 also clamped between the components 64 and 65. The piston assembly is held together between a washer 72 and the flanged head 73 of bolt 66 which head is formed integral with an eye 74 through which passes a gudgeon pin 75 securing to said eye the end of the rod 20 through the medium of which the piston movements are caused to react upon the pedal of the brake applying mechanism.

The nut 76 which secured the assembly above described upon the eye bolt 66 also holds in position a dished washer 77 adapted to retain in connection with the piston one end of the spring 22 disposed within the cylinder 2 to oppose the movement of the piston and return it to normal position after operation.

The construction above described enables the piston components to be of relatively light construction consistent with strength as the actual work of closing the end of the cylinder to ingress or egress of air as the case may be, is performed by the washer 69 under the action of its spring 71. The piston assembly is thus, in effect, a framework to support the washer and spring and does not need to form a gas tight fit with the cylinder walls. In these circumstances, the wear on the piston is reduced and is a factor enabling the light structure described to be employed.

Within the cylinder wall its outer end is a lubricant supply port 78 which keeps the annular space 79 between the piston components supplied with lubricant whenever the piston returns to the inoperative position shown in Fig. 1 wherein its movement under the influence of spring 22 is stopped by its engagement with an annular shoulder 80.

The alternative piston construction shown in Fig. 7 is designed for application to pistons of larger diameter than that shown in Fig. 1 and wherein a single central bolt is insufficient to hold the components in correct operative relationship.

The piston shown in Fig. 7 consists of pressed steel components 81 and 82, each component being strengthened by a central dished portion 83. The component 82 comprises two portions of differing diameters to form an annular space 84 in which operates the free portion 85 of an annular cup washer 86 clamped between the outer portions of the components 81 and 82 by a series of bolts 87 which also retain an annular leaf spring 88 whose outer portion serves to maintain the portion 85 of the washer in close contact with the wall of the cylinder 2.

The central portion of the piston assembly is constructed and arranged in a manner very similar to that already described with reference to Fig. 1 and comprises an eye-bolt 90 on which the components 81 and 82 and washer 91, retaining the end of spring 22, are clamped by means of a nut 92. To the eye-bolt 90 is also connected by a gudgeon pin 93, the arm 20 connected to the brake operating mechanism.

The cylinder 2 is provided with an oil inlet 94 which maintains a supply of lubricant to the annular space 84 at each outward or return stroke of the piston which is thereby maintained under constant and even lubrication throughout its periods of operation.

The casing 1 of the brake operating mechanism above described is designed for production by die casting and for this reason the upper portion of the said casing is closed by a sheet metal cover 95.

The general operation of the devices above described is as follows:

When the operating pedal is depressed, axial movement in the direction of the arrows shown in Figs. 1 and 3 is imparted to the rod 4 and this movement is communicated to the bushing 7, which, having direct engagement with the reaction lever components 8 and 8a, causes these components to rock around the connection of their lower ends to the rod 20, which they are free to do owing to the lost motion connections between bushing 7 and pin 9 and between the components 8 and 8a and the rod 13. The upper ends of the reaction lever components 8 and 8a are, therefore, rocked towards the right in Fig. 1, this movement causing rod 19 to be operated to move the valve 49 (Fig. 5 or 6) off its seat in the manner already described to place the cylinder 2 under vacuum. The pin 14, levers 18, fork 11 and rod 12 advance slightly during the initial rocking of the lever components 8 and 8a, but such advance of these parts may take place freely while there is slack in the brake system. The vacuum operation in the cylinder 2 subsequently moves the whole lever system around the fixed pin 13 towards the position shown in broken lines in Fig. 1. As the pressure applied to the pedal is relaxed, the levers rock so as to cause the valve to vent the cylinder to the atmosphere, and the spring 22 in the cylinder 2 assists the spring 23 to restore the parts to the normal positions shown in Fig. 1 in which the brakes are "off."

When the vacuum supply to the cylinder is not available for any reason, the brakes can be applied by the pedal pressure only and in that case, the effort will be applied centrally through the bushing 7 to the pin 9 and the brake levers 10, 10a and brake operating rod 12. This arrangement possesses the advantage that the effort applied passes centrally and directly to the brake operating rod 12 without any tendency to strain the transmission members by twisting and that for such reason the effort applied to the pedal is utilised to better effect than in previous forms of construction.

Although the rod 4 has been described above as a push rod to apply the brakes, it will be obvious that the invention can be equally applied to a brake applying mechanism actuated through a pull rod.

We claim:

1. A servo brake unit comprising a casing, a servo cylinder forming part of said casing, a distributor valve housing attached to said casing, transmission mechanism mounted in said casing, connections between said mechanism and an operating pedal, brake mechanism, distributor valve and a piston in the servo cylinder, an air inlet situated in the upper part of said casing and a baffle arranged to screen the air inlet to the distributor valve housing.

2. A servo brake unit according to claim 1 wherein the said air inlet is provided with a baffling device having slots protected by louvres to cause deposit of dust as the air enters the casing through the said slots.

3. A servo brake unit comprising a casing, transmission mechanism, a distributor valve and a servo cylinder mounted in said casing, a reaction lever forming part of said transmission mechanism, a pedal actuated operating rod, a brake actuating rod, a common element mounted in said reaction lever to which both of said rods are connected, means for preventing ingress of air to said casing around the said rods, an air inlet situated in the upper portion of said casing, baffling means situated adjacent said air inlet and a baffle arranged to screen the air inlet to the housing of said distributor valve.

4. For use with a servo brake unit having a casing, a servo cylinder forming a part of said casing, transmission mechanism mounted in said casing, pedal actuating means and a brake operating rod connected to said transmission mechanism in such manner as to provide a direct connection from the one to the other, a lever connecting said mechanism to a piston in the servo-cylinder, a distributor valve housing adapted to be secured to said casing and having an air inlet communicating with the interior of said casing mechanism with a valve spindle movably mounted in said housing, a pair of valve elements mounted on said spindle and adapted to control ports in said housing communicating with said servo cylinder, the distributor housing having valve seats so spaced along the axis of said spindle that when one of said valve elements is open the other is seated, and baffle means for preventing entry of dust to said distributor valve housing air inlet.

5. A servo brake unit according to claim 4 wherein the said valve elements are movable one at a time in opposite directions according to the direction of movement of their operating rod, a spring being provided which is compressed by opening movement of one valve element to maintain the other valve element on its seat.

6. A servo brake unit according to claim 4 wherein one of said valve elements controls a vacuum port in the servo cylinder and the other valve element controls an air inlet port in said cylinder.

7. A servo brake unit according to claim 4 wherein one of said valve elements is slidable within the other, the movement of the outer valve member being limited by contact of its inner end with a shoulder on the inner valve member whose movement is also limited by contact of its inner end with the closed end of the outer valve member, a spring being interposed between the two valve members so as to be compressed by the opening of one of them to maintain the other on its seat.

8. A servo brake unit comprising a casing, a servo cylinder forming part of said casing, a distributor valve housing attached to said casing, transmission mechanism mounted in said casing, pedal actuating means and a brake operating rod connected to said transmission mechanism in such manner as to provide a direct connection from the one to the other, a lever connecting said transmission mechanism with a two part piston in the said servo cylinder, linkage connecting said transmission mechanism with a double acting valve in said distributor valve housing and baffle means in said casing to prevent ingress of dust to said distributor valve housing.

9. A servo brake unit comprising a casing, a servo cylinder forming part of said casing, a distributor valve housing attached to said casing, a reaction lever forming part of said transmission mechanism, a pedal actuated operating rod, a brake actuating rod, a common element mounted in said reaction lever to which both of said rods are connected, a lever connecting said transmission mechanism with a two part piston in the servo cylinder and embodying a spring operated cup washer, linkage connecting said transmission mechanism with a double acting valve disposed in said distributor valve housing and controlling ports in the servo cylinder, an air inlet to the upper part of said casing and baffle means adjacent said inlet and within said casing to prevent ingress of dust to said distributor valve housing.

10. A monobloc servo brake unit comprising a casing, a distributor valve and a servo cylinder mounted in said casing, a pedal actuated operating rod extending into said casing, a brake operating rod extending into said casing in a position opposite to said pedal actuated rod, a reaction lever mounted in said casing, a lost motion connection between said pedal actuated rod and an element carried by said reaction lever, a direct connection between said element and said brake operating rod, a lost motion connection between one end of said reaction lever and a fixed pivot, a connection between said one end of said reaction lever and said distributor valve, and a connection between the opposite end of said lever and a piston in said servo cylinder.

11. A monobloc servo brake unit comprising a casing, transmission mechanism, and a servo cylinder all mounted in said casing, a reaction lever forming part of said transmission mechanism, a pedal actuated operating rod, a brake actuating rod, a bushing mounted in the said reaction lever, a connection between the pedal actuated rod and said bushing, brake levers mounted over a fixed pivot to which the reaction lever is also loosely connected, a pin carried by said brake levers and extending through said bushing and connections between the ends of said pin and the brake actuating rod.

12. A monobloc servo brake unit comprising a casing, transmission mechanism, and a servo cylinder all mounted in said casing, a reaction lever forming part of said transmission mechanism, a pedal actuated operating rod, a brake actuating rod, a bushing mounted in the said reaction lever, a connection between the pedal actuated rod and said bushing, brake levers mounted over a fixed pivot to which the reaction lever is also loosely connected, a pin carried by said brake levers and extending through said bushing, connections between the ends of said pin and the brake actuating rod, a pivotal connection between the lower ends of the brake levers and the reaction lever and a connection between the lower end of the reaction lever and the piston in the servo cylinder.

13. In a servo actuated brake, a housing, a pair of spaced parallel arms journalled for pivotal movement about a fixed axis in said housing and adapted to have their free ends connected to a servomotor, a rod connected to said arms in spaced parallel relationship to said fixed axis, a pair of parallel spaced levers journalled on said rod in closely adjacent symmetrical relationship to said arms, a cross member connected to said arms in spaced parallel relationship to said fixed axis and said rod, an actuating element mounted for endwise reciprocation through an opening in one wall of said housing and connected to said cross member midway between said pairs of arms and levers, so as to apply a turning movement thereto free from twisting or axial components when it is reciprocated, a brake operating member substantially axially aligned with said actuating element and mounted for endwise reciprocation in an opposite wall of said housing, and means for connecting said brake operating member to spaced regions of said cross member symmetrically located with respect to the region of connection of said actuating element to said cross member, thereby eliminating any tendency of said actuating element or said brake operating member to set up twisting forces in said arms or levers.

14. The brake mechanism defined in claim 13, wherein said levers are disposed intermediate said arms and said actuating element is connected to said cross member intermediate said levers.

15. The brake mechanism defined in claim 13, wherein said brake operating member is provided with a forked end connected to said cross member outwardly of said arms.

16. The brake mechanism defined in claim 13, wherein said actuating element and said levers are connected to a bushing surrounding said cross bar, in radially spaced relationship, so as to provide a predetermined degree of lost motion therebetween.

17. In a brake actuating mechanism, a housing, a plurality of brake actuating members pivotally mounted in said housing, an air inlet opening in one wall of said housing and an air outlet opening in another wall of said housing, said actuating members being disposed in the path of air flow from said inlet to said outlet, so as to entrain dust particles contained in the air stream, a valve mechanism secured to said housing and operable to control brake actuation, and having an air inlet port communicating with the air outlet opening of said housing, and a baffle mounted in said housing adjacent said air outlet opening in the path of air flow through said housing for preventing dust particles from being carried through said outlet opening into said valve air inlet port.

SYDNEY EDGAR WILLETT.
STANLEY HOWARD EDGE.